United States Patent

[11] 3,581,129

[72] Inventors Wolfgang Ganter
Schramberg/Sulgen;
Friedrich Assmus,
Schramberg/Wurttenberg, Germany
[21] Appl. No. 43,702
[22] Filed June 5, 1970
Division of Ser. No. 816,264, April 15, 1969, Pat. No. 3,529,414 in turn a Division of Ser. No. 555,766, Pat. No. 3,456,137.
[45] Patented May 25, 1971
[73] Assignee Messrs. Gebruder Junghons Gesellschaft mit Beschrankter Haftung
Schramberg Wurttenberg, Germany

[54] TUNING FORK DEVICES
2 Claims, 2 Drawing Figs.

[52] U.S. Cl. .......... 310/25, 318/132, 58/23
[51] Int. Cl. .......... H02k 33/00
[50] Field of Search .......... 310/21, 25, 36; 318/128, 137; 331/156, 154; 58/23; 89/409, 457

[56] References Cited

UNITED STATES PATENTS

| | | | |
|---|---|---|---|
| 3,207,965 | 9/1965 | Lavet .......... | 318/128 |
| 3,485,032 | 12/1969 | Ishikawa et al. .......... | 58/23 |
| 3,496,391 | 2/1970 | McShan .......... | 310/25 |
| 3,506,897 | 4/1970 | Clifford .......... | 318/128 |

*Primary Examiner*—D. F. Duggan
*Attorney*—Watson, Cole, Grindle and Watson

ABSTRACT: A tuning fork for timekeeping devices having two parallel tines with a permanent magnet mounted on each free end thereof and means to mount the tines on a baseplate and a housinglike magnet-return bracket fixed to the baseplate and surrounding the permanent magnets and bearing the coil assembly.

Figure 1:
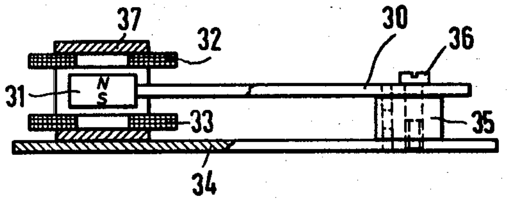

INVENTORS
Wolfgang Ganter
Friedrich Assmus
BY
Watson, Cole, Grindle & Watson
Attys.

TUNING FORK DEVICES

This application is a division of application Ser. No. 816,264, now U.S. Pat. No. 3,529,414; in turn a division of application Ser. No. 555,766, now U.S. Pat. No. 3,456,137.

The invention relates to a tuning fork kept in vibration in an electromagnetic manner, preferably as a movement-regulating oscillator, for timekeeping devices with a housing-type magnet arrangement with a largely closed magnetic path and with a coil arrangement. The latter consists preferably of a control coil and a driving coil, in the input or the output circuit of an electronic amplifier circuit, especially a semiconductor amplifier circuit, which is exposed with the aid of the vibrating tuning fork to a changing magnetic flux.

A tuning fork arrangement held in vibration in an electromagnetic manner has been known, where a fixed framelike element of ferromagnetic material has been provided, which contains two permanent magnets, by means of which corelike parts oppose each other leaving an air gap between them, and of which one carries the coil arrangement, are premagnetized. The prongs of the tuning fork project into the air gap of the premagnetized frame and during their vibration cause a periodic change in the magnetic flux permeating the air gap and thus also the coil arrangement arranged on the corelike element. In this case the arrangement of the coils on a premagnetized corelike element is disadvantageous since forces of attraction of varying magnitude are exerted on the tuning fork, as a result of which the isochronism of the vibrating tuning fork will be disturbed.

The invention has an object of creating a tuning fork, held in vibration in an electromagnetic manner, which is suitable as a movement regulating oscillator for timekeeping devices, especially watches and clocks, and which can also be inserted into watches of small dimensions. The invention has been characterized by the fact, that the magnet arrangement consists of permanent magnets arranged at the ends of the prongs of the tuning fork, and magnetized perpendicularly in relation to the plane of oscillation, in that the coil arrangement consists of coaxially arranged coreless flat coils and in that the housinglike magnet arrangement has return elements running parallel to the plane of oscillation and opposite the magnet poles directed toward the coil arrangement. As a result thereof, a tuning fork of a very flat design is created which is not disturbed by magnetic retracting forces in its oscillation.

At the ends of the prongs of the tuning fork, U-shaped return brackets can be arranged, each of which is applied to a pole of the magnet arrangement facing away from the coil arrangement and encircles one side of the arrangement. A fixed magnetic return element can also be provided, in which the coils have been arranged in planes parallel to the plane of oscillation of the prongs of the tuning forks at both sides of at least one prong of a tuning fork.

Figure 2:
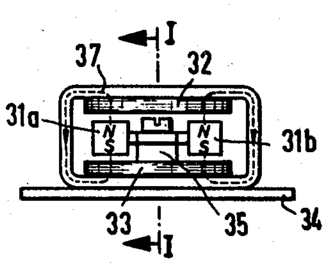

Further objects will be apparent from the description when considered in connection with the accompanying drawing in which:

FIG. 1 is a part section and a side showing a second embodiment of the invention by way of example, with a fixed return element in a longitudinal section taken on the line 1–1 in FIG. 2, in the direction of the arrows, and FIG. 2 is a front view of the embodiment in accordance with FIG. 1.

In FIGS. 1 and 2, the numeral 30 designates a tuning fork, the prongs of which, at their ends, carry permanent magnets 31*a* and 31*b*, which are magnetized perpendicularly in relation to the plane of oscillation of the prongs of the tuning fork. The tuning fork 30 is attached to a baseplate 34 with its bridge by means of a distancing element 35 and a screw 36, which baseplate in the area of the ends of the tuning fork carries a housinglike return element 37 in which coils 32 and 33 have been arranged fixedly at both sides of the permanent magnets 31*a* and 31*b*. FIG. 2 shows the course of the magnetic flux in broke lines. A strongly closed magnetic circuit results with small oscillating masses.

The embodiment shown and given by way of example is an arrangement of tuning fork with a relatively low constructional height, which operates with a high degree of effectiveness and thus is especially suited for battery-operated watches of a small size.

We claim:

1. A tuning fork arrangement for use in a timekeeping device, comprising two parallel tines with a permanent magnet mounted on each free end thereof, each of said permanent magnets magnetized in a direction perpendicular to the direction of oscillation of said tines, a baseplate lying in a plane parallel to the plane of said tines, means perpendicular to said plate and said plane to fixedly connect said plate and said fork at the end of the tines opposite the free ends of said tines, a coil assembly consisting of a pickup and a drive coil of an electronic amplifier circuit coaxially mounted, a housinglike magnetic return bracket fixed to the base plate and surrounding the permanent magnets and bearing the coil assembly, the coils lying in planes parallel to the direction of oscillation of said tines whereby an approximately closed magnetic path is maintained through each set of permanent magnet, bracket and portion of coil assembly.

2. A tuning fork according to claim 1, in which the coils are arranged to opposite sides of the return bracket.